Nov. 5, 1935.  G. WOLF  2,019,639
HAND OPERATED CULTIVATOR
Filed Nov. 27, 1933
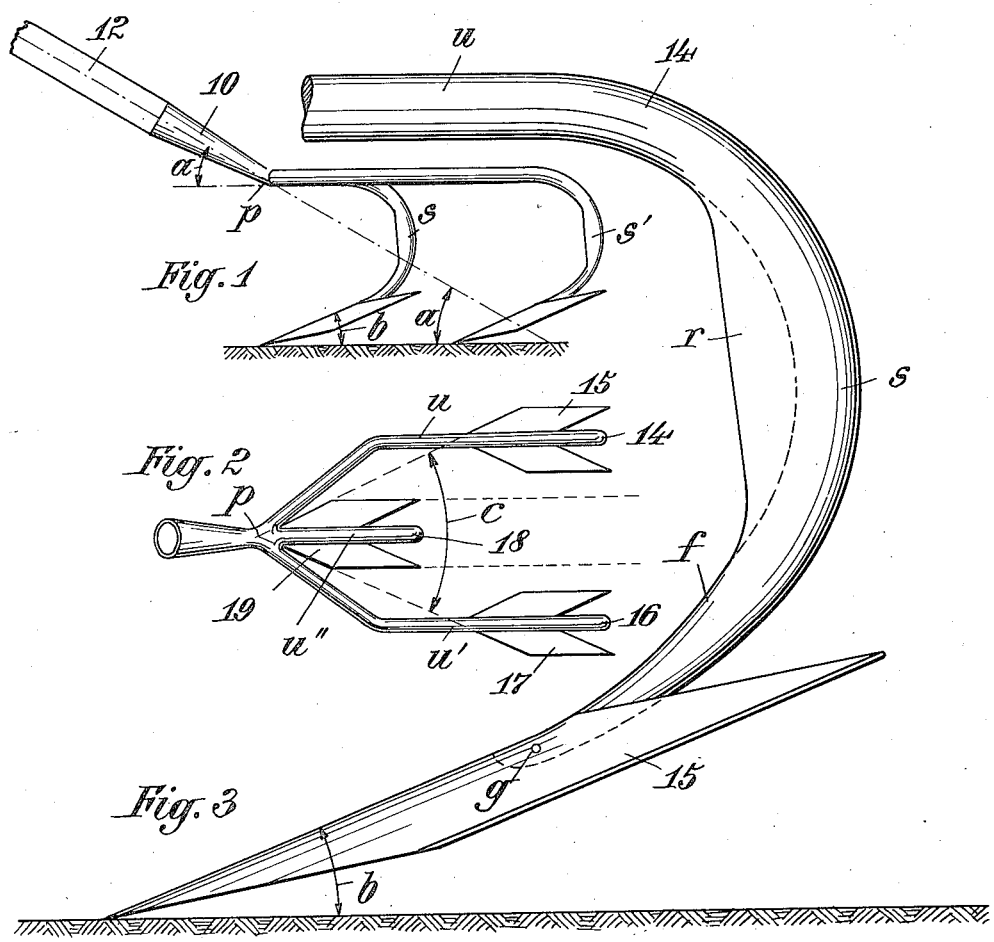
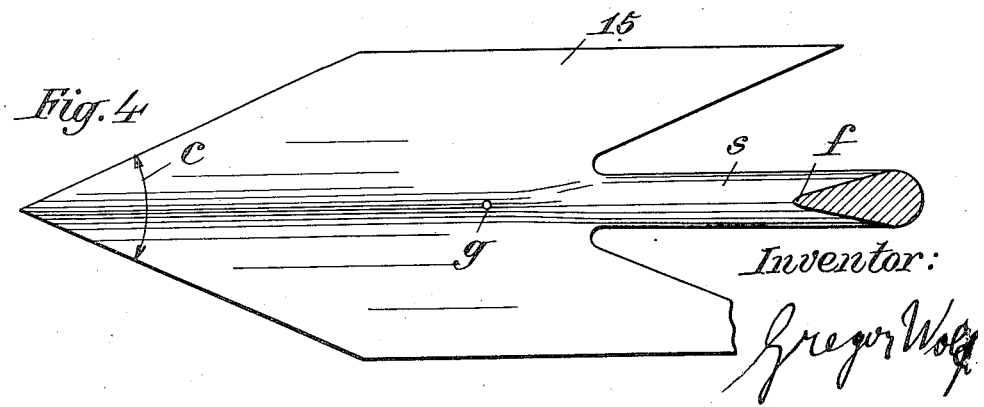
Inventor:
Gregor Wolf Patented Nov. 5, 1935

2,019,639

UNITED STATES PATENT OFFICE 2,019,639

HAND OPERATED CULTIVATOR

Gregor Wolf, Betzdorf/Sieg, Germany

Application November 27, 1933, Serial No. 699,902
In Germany November 30, 1932

3 Claims. (Cl. 97—63)

My invention relates to agricultural implements, known as cultivators and being designed for breaking up the surface of the ground, while the crops are growing, keeping the soil in porous condition, cutting off the weeds and like operations; and more especially to structural improvements in hand operated cultivators of the type, having a plurality of shares which are pointed at their frontal edge and are attached by a skeleton of stems to a common handle.

As a matter of fact with hand cultivators of that type and of known design, as widely used, because of the upwardly directed component of the reciprocating motion usually imparted to the implement by the operator there is always a tendency to lift and extract the shares from the ground with the result that constant strain and attention are required to keep the shares of the cultivator at their proper depth in the soil.

While with horse drawn cultivators the depth at which the shares proceed in the soil is substantially constant viz. depending on the depth up to which the wheels of the machine incise the soil and the working of special depth controlling contrivances, hand operated cultivators cannot be provided with additional depth controlling appliances as these would render the implement too heavy and seriously impair its usefulness.

The principal object of this invention is to overcome these drawbacks by providing an improved hand cultivator of the type set forth, viz. so redesigned that the lifting forces tending to withdraw the implement from the ground are counterbalanced by gravitational and frictional forces cooperatively tending to keep the implement at its appropriate depth in the ground.

The invention further aims at so designing the spade carrying stems of the implement, that they will effectively assist in the breaking, cutting and comminuting operations and will easily resist to hard usage viz. heavy shocks and bending stresses as occurring in hard and stony soil.

Other objects of the invention will become incidentally apparent hereinafter to practitioners, viz. agriculturers and gardeners, using cultivators and to manufacturers of agricultural implements.

The nature and scope of the invention are briefly outlined in the appended claims and will be more fully understood from the following specification taken together with the accompanying drawing, in which Fig. 1 is a side elevation of a hand cultivator designed according to this invention and being shown by way of an example, Fig. 2 is a top view, Figs. 3 and 4 show in a larger scale one of the shares of the cultivator and the stem attached thereon as seeen from above and in side elevation.

In the course of my research work in which a great many comparative experiments—hundreds—were carried out with cultivators of widely varying design, the best results—as regard ease of handling the implement, steadiness and uniformity of the work done, viz. in loosening the soil, banking up earth against the stalks etc., and—before all—tendency of remaining at the proper working depth in the ground were obtained by cultivators presenting a number of specific structural features in combination, viz. including the angle of inclination of the handle and the body of the shares to the surface of the ground, shape of shares and position of the point of attachment of each individual share to the arm by which it is carried, angle of convergency of the front edges of each share, and disposition of shares relatively to each other and to their common point of suspension, viz. where their carrier arms are attached to the handle.

With the embodiment of the invention shown in the drawing by way of example the cultivator consists of a shank or socket member 10, to which a handle 12 and three spade carrying arms 14, 16, 18 are attached in such disposition that, when the implement is in proper operative position in the soil the handle 12 will be at an angle $a$ of about 25°–35° relatively to the surface of soil, while the body of the spades 15, 17, 19 forms an angle $b$ of about 20°–30° with the soil-surface.

The spade carrying arms are formed with upper shanks $u$, $u'$, $u''$, which are disposed substantially parallel to the soil and with downwardly extending sickle shaped portions $s$, $s'$.

The spades 15, 17, 19 are arrow-shaped, having two wings in the form of parallelograms, which are joined at the central axis of the arrow and are slightly inclined relatively to each other, so as to present the form of a relatively flat gable roof.

Other structural and functional features of importance involved in the shape of the spades and their disposition relatively to each other, to their carrier arms and to the socket 10 are the following: The converging front edges of the spades are set at an angle $c$ of about 40°–50° (Fig. 4), the spades are attached substantially at their centre of gravity $g$ to the lower end of the sickles $s$, which are drop-shaped, viz. gradually getting thinner and thinner, the spade carrying arms are so arranged that the spades form a triangle pointing to the socket 10 of the implement (Fig. 2), the front corner of the spade in front 19 being substantially underneath the point $p$ of attachment of the spade carrying arms to the socket 10.

An accessorial structural feature of the spade carrier arms of the improved cultivator consists therein that the sickle-shaped portions of the spade carriers are provided with a sharpened front edge $f$ as seen in Fig. 4.

Various changes and modifications may be made in the shape and disposition of the different elements of the improved cultivator described above, without departing from the spirit and the salient ideas of this invention.

For instance the sickle-shaped portion $s$ of the spade carrying arms may be provided at their front edges with a bracing rib $r$, shown in Figs. 1 and 3

What I claim is:—

1. A hand operated cultivator, comprising in combination a socket adapted to be attached to a handle and inclined to the surface of the ground, a plurality of horizontal branches from the lower end of said sockets, a plurality of parallel horizontal arms of different lengths extending from each of said branches, sickle-shaped downward extensions one on the end of each of said arms, and a plurality of blades connected in their centre of gravity one to the lower end of each of said sickle-shaped extensions, said blades each having two wings each in the form of a parallalogram with outer sides parallel to said parallel arms and inner parallel sides united in alignment with the lower end of its sickle-shaped extension, said wings sloping downwards towards their outer sides, cutting edges on the front end of said wings converging at an acute angle to form a point adapted to support the blades on the ground so that the cutting edges ascend from the ground and form an acute angle therewith.

2. A hand operated cultivator as specified in claim 1, in which the sickle-shaped extensions have each a reinforcing rib intermediate their length tapered towards its front edge extending perpendicularly to the ground.

3. A hand operated cultivator as specified in claim 1, in which the points of the blades are arranged so that imaginary lines uniting these points form an isosceles triangle the outer cutting edges of the blades being situated in alignment with the lines forming the equal legs of this triangle.

GREGOR WOLF.